May 6, 1930. R. STRINDBERG 1,757,690
FILTER MAT
Filed March 16, 1928   2 Sheets-Sheet 1

Inventor
Richard Strindberg
By Emil Bönnelycke
Attorney

May 6, 1930.   R. STRINDBERG   1,757,690
FILTER MAT
Filed March 16, 1928   2 Sheets-Sheet 2

Inventor
Richard Strindberg
By Emil Bönnelycke
Attorney

Patented May 6, 1930

1,757,690

UNITED STATES PATENT OFFICE

RICHARD STRINDBERG, OF BRADFORD, PENNSYLVANIA

FILTER MAT

Application filed March 16, 1928. Serial No. 262,174.

This invention relates to a filter mat for air and gas filters and to a method of making the same. The main object of the filter mat is to provide a filter means which will be highly effective for the purpose of removing dust and other matter carried in suspension by air or gas and the construction is such that the accumulated dust in the mat can be easily washed out or removed therefrom.

It is an object of this invention to provide a base or frame of preferably deformable or bendable material upon which the filter material is wound or otherwise attached to form a flat or curved mat which can be easily handled and cleaned. The base or foundation of the mat consists of a wire frame which has a general zig-zag shape or comprises a series of U-shaped members connected together at their ends one to the other. It is a further object to not only form a flat sheet but to form a curved sheet and also having other forms such as cylindrical, conical or prismatic depending upon the requirements and the specific application. A further object resides in making up the filter mat by winding a filter element or medium over or through a structural frame of wire or other material in such a manner that the filtering strands or elements are alternatively on top of and on the bottom of the frame at the same time covering all of the surfaces of the frame. The filter element or medium can comprise any suitable material preferably as a strand having a material projecting therefrom in every direction of metal, wool, cotton or other suitable material. Also strips of knitted or woven mesh or flattened or twisted wire having, if desired, indentations or pittings can be used. In fact any filter element can be used if it can be wound on the frame and if it acts to divide the air or gas stream into paths each of which is tortuous and impinges thereon.

It is a still further object of the invention to construct a frame for a filter mat which is somewhat flexible and upon which the filter element can be wound in such a way that it can be adjusted, compressed or forced together to obtain the desired density of filter material.

An advantage of this filter mat is that any degree of compactness can be secured and the mat may be so compact that it is impossible to see through it at the same time the mat shows an unusually low resistance.

Figure 1:
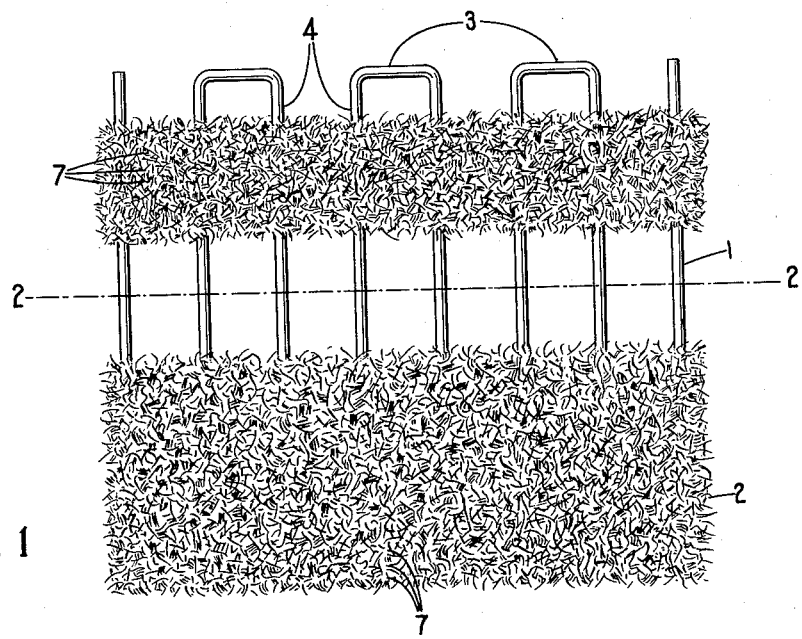
Figure 2:
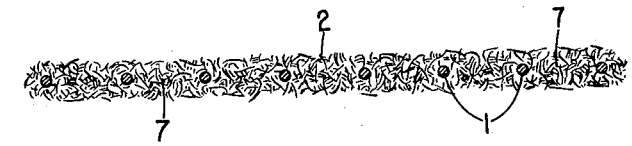
Figure 3:
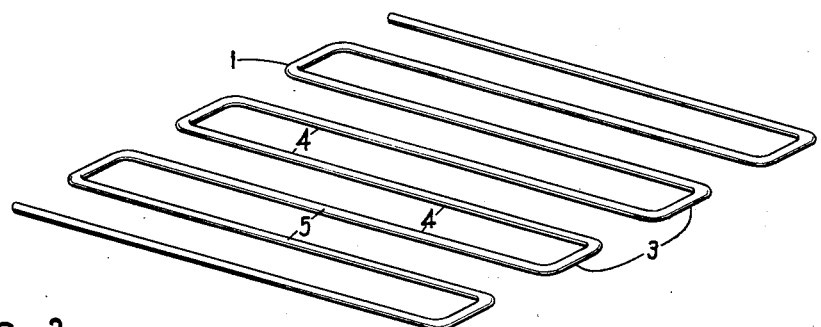
Figure 4:
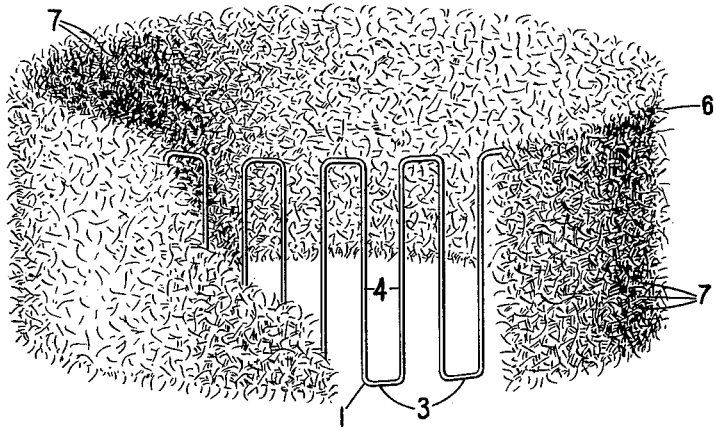
Figure 5:
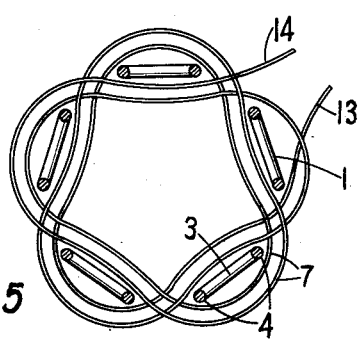
Figure 6:
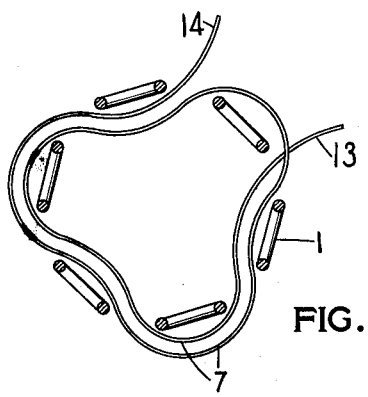
Figure 7:
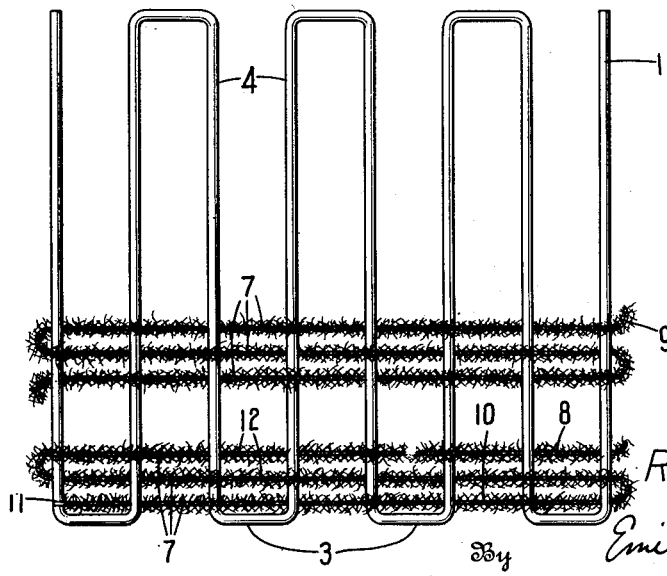

Further objects will be apparent from the following description taken in connection with the accompanying drawing in which:

Figure 1 is a top view of a filter mat showing portions of the filter medium removed to show the frame, Fig. 2 is a cross-section on line 2—2 of Fig. 1, Fig. 3 is a perspective view of a preferred form of the frame of the mat, Fig. 4 is a perspective view of a cylindrical filter mat showing a portion of the medium removed to show the frame, Fig. 5 is a diagrammatic view of a circular mat showing one form of winding, Fig. 6 is a diagrammatic view of a circular mat showing another form of winding, and Fig. 7 is a top view of a flat mat frame showing several methods of winding.

The frame 1 of the filter mat 2 is preferably constructed of a foraminous material, such as metallic wire and is bent to form a plurality of U-shaped members 3 at each side. The arms 4 of the U-shaped members are connected to each other at the ends and thus the entire frame forms a continuous and integral zig-zag shaped frame. The long connecting pieces 5 which comprise the arms 4 can be parallel or non-parallel as desired and the U-shaped members can comprise circular portions or V-shaped portions but the form as illustrated seems the more efficient construction and shape since it permits easy winding of the filter medium and any adjustment thereof either as the medium is wound or after winding. The size of the wire for the frame is so chosen that the frame will be somewhat springy and slightly flexible but, of course, capable of holding its general shape. Figs. 1 to 3 illustrate a flat or plate-like mat which, of course, can be a curved plate or circular as in Fig. 4 or can be made of any other desired shape and size. The form shown in Fig. 4 is a cylindrical mat 6 and is adapted for the air intake of a carbureter of an internal combustion engine, whereas the mat according to Figs. 1 to 3 is for a filter cell of the unit type as shown, for instance, in application Serial No. 714,676, filed May 20, 1924. The form of Fig. 4, however, is also adaptable for other applications where a drum is the most desirable shape for a filter cell.

The frame 1 of the mat is provided with a filter medium in the form of a suitable flexible brush-like strand or strands 7 which is wound as a continuous strand on the frame. The strand may comprise a so-called garland structure as shown in application Serial No. 116,595 now Patent No. 1,700,126, issued Jan. 29, 1929, in which a plurality of metallic spines are arranged radially on a textile strand. Also such strand can comprise a core of wire or textile material from which projects a brush-like material of wool, cotton or the like. Also strips of knitted or woven mesh of metal or textile material may be used and knitted ribbon-like mesh, as disclosed in Patent No. 1,676,191 of July 3, 1928 may also be used. Also flattened wire with or without indentations or pittings either flat or twisted can also be used and as a matter of fact, it is possible to use a filter medium of any shape, size and material which is capable of being wound on the frame but it is preferable to use a medium which has flat surfaces even though small in order to act as baffles to the air stream to provide an efficient filter.

The strand 7 of filter medium can be wound on the frame in any suitable and desired manner. Fig. 7 clearly indicates how the strands may be wound on the frame and strand 8 indicates one method and strand 9 is another method. It is, however, preferable that the first and last strand be wound as indicated by the section 10 of strand 8, in order to prevent the medium from slipping from the frame. The winding is begun by securing the end thereof to the frame at 11 and moving across the frame at the same time winding the strand in and out of the arms 4. Section 12 of strand 8 is wound in and out taking two arms at a time and the strand is wound back and forward until the entire frame is covered. As the winding continues, the strands may be compressed or forced together sidewardly to thus secure the desired density of the filter medium. The frame may, however, be entirely wound in the manner of section 10, as indicated by strand 9 or alternate winding as strands 8 and 9 may be adopted.

The winding of the strand on the frame may also be described as a weaving method in which the strand is woven into the arms of the U-shaped members. Also taking two arms at a time, a woven plate or mat is obtained since the filter medium comprises the strands in one direction and the frame the strands in the other direction.

When using an automatic machine for winding the strands on the frame it is preferable to use the winding as indicated by sections 12 of Fig. 7 whereby the first and last strands will pass through each U-shaped member which will prevent the medium from slipping from the frame.

When winding so-called endless mats, such as cylindrical mats, Figs. 4 to 6, it is of importance to choose the number of U-shaped members, since the number thereof controls the type of the finished mat. If the strand is intertwined or wound in and out of each arm, it is, of course, immaterial how many U-shaped members are chosen but it is preferable to wind the strand in and out of every two arms. Fig. 5 shows one type in which an uneven number of U-shaped members, considered edgewise, that is, the upper and lower peripheral edges, comprise the frame to produce a mat in which the entire frame is covered, and Fig. 6 is the other type in which an even number of members, considered edgewise, comprise the frame but in which only parts of the frame are covered. The form of Fig. 5 is preferable since a more efficient mat is produced thereby. In Figs. 5 and 6, the winding of the strands 7 can be traced starting at 13 and finishing at 14 from which it can be seen that by using an odd number of U-shaped members that every second turn of the strand will cover the inner and outer side thereof in succession, whereas by using an even number of U-shaped members, only one side thereof will be covered alternately on the inside and outside which does not produce as firm a mat as one constructed according to Fig. 5. The form according to Fig. 5, therefore, completely covers the entire frame and provides a very efficient filter. The form shown in Fig. 4 is wound according to Fig. 5.

The filter to which this flat mat is well adapted is of the semi-dry type in which the layers of the mats are coated with a suitable adhesive solution, such as glycerine or any other viscous oil or liquid either by immersion or by other-wise coating the layers. Thus the spines or bushy parts of the filter medium become coated with the viscose material and as the air or gas impinges thereagainst, the particle in suspension will adhere to the viscose material.

I claim as my invention:—

1. A filter mat for an air and gas filter comprising a zig-zag shaped frame composed of a continuous wire bent into a plurality of oppositely arranged U-shaped members connected to each other by their arms, and a filter medium in the form of a strand interwound in and around the arms to cover the frame.

2. A filter mat for an air and gas filter comprising a zig-zag shaped frame composed of wire shaped and having a plurality of connected arms, and a filter medium in the form of a strand arranged in and around the arms to cover the frame.

3. A cylindrical filter of the drum type comprising a cylindrical zig-zag shaped frame composed of a plurality of U-shaped members connected to each other by their arms to form a continuous structure, and a filter medium intertwined in and out of said U-shaped members to completely cover both sides of the frame.

4. A cylindrical filter of the drum type for the air intake of an internal combustion engine comprising a cylindrical zig-zag shaped frame composed of a plurality of oppositely arranged U-shaped members connected to each other by their arms to form a continuous structure, and a filter medium intertwined in and out of said U-shaped members, the U-shaped members comprising an odd number on each edge of the frame to completely cover both sides thereof.

5. A cylindrical filter for the air intake of an internal combustion engine comprising a cylindrical zig-zag shaped frame composed of a plurality of oppositely arranged U-shaped members connected to each other by their arms to form a continuous structure, and a flexible filter medium in the form of a strand intertwined in and out of said U-shaped members, the U-shaped members comprising an odd number on each edge of the frame to completely cover both sides thereof.

In testimony whereof I affix my signature.

RICHARD STRINDBERG.